US012725057B2

(12) United States Patent
Wang et al.

(10) Patent No.: US 12,725,057 B2
(45) Date of Patent: Sep. 1, 2026

(54) ACCURATE AND PERSONALIZED RECOMMENDATION METHOD BASED ON KNOWLEDGE GRAPH

(71) Applicant: Northwestern Polytechnical University, Xi'an (CN)

(72) Inventors: Zhu Wang, Xi'an (CN); Zilong Wang, Xi'an (CN); Zhiwen Yu, Xi'an (CN); Bin Guo, Xi'an (CN); Xingshe Zhou, Xi'an (CN)

(73) Assignee: Northwestern Polytechnical University, Xi'an (CN)

( * ) Notice: Subject to any disclaimer, the term of this patent is extended or adjusted under 35 U.S.C. 154(b) by 1085 days.

(21) Appl. No.: 17/726,461

(22) Filed: Apr. 21, 2022

(65) Prior Publication Data

US 2022/0245488 A1 Aug. 4, 2022

Related U.S. Application Data

(63) Continuation of application No. PCT/CN2020/117181, filed on Sep. 23, 2020.

(30) Foreign Application Priority Data

Nov. 27, 2019 (CN) ........................ 201911183454.6

(51) Int. Cl.
*G06N 5/04* (2023.01)
*G06N 3/042* (2023.01)
*G06N 5/02* (2023.01)

(52) U.S. Cl.
CPC ............... *G06N 5/04* (2013.01); *G06N 3/042* (2023.01); *G06N 5/02* (2013.01)

(58) Field of Classification Search
CPC ............. G06N 5/04; G06N 3/042; G06N 5/02
See application file for complete search history.

(56) References Cited

U.S. PATENT DOCUMENTS

2017/0161279 A1* 6/2017 Franceschini .......... G06N 5/022
2021/0027146 A1* 1/2021 Xu ..................... G06Q 30/0201

FOREIGN PATENT DOCUMENTS

CN 106712995 A * 5/2017 ............ H04L 41/12
CN 108733798 A * 11/2018

(Continued)

OTHER PUBLICATIONS

Wang et al. (Knowledge Graph Convolutional Networks for Recommender Systems, published Mar. 18, 2019) (Year: 2019).*

(Continued)

*Primary Examiner* — David Yi
*Assistant Examiner* — Syed Rayhan Ahmed
(74) *Attorney, Agent, or Firm* — Westbridge IP LLC

(57) ABSTRACT

This disclosure provides an accurate and personalized recommendation method based on a knowledge graph, which includes following steps: acquiring relevant knowledge of objects from a knowledge base according to historical behaviors of a user, and constructing a knowledge graph; initializing a vector representation of each node and its connection, and determining a receptive field of the node; generating training samples according to the historical behaviors of the user, and initializing a vector representation of all users and objects; acquiring a receptive field of an entity in the knowledge graph corresponding to the object in the training sample, then inputting the receptive field and the training sample to a graph neural network model to obtain predicted values of a possibility of an interaction between the user and the object. According to the disclosure, a sparsity of the historical behavior information of the original user is compensated with the knowledge graph information, and the user and objects are depicted in multi-dimension, so that the personalized recommendation is more accurate.

6 Claims, 4 Drawing Sheets

Increasing Information Interaction between Neighbor Nodes and Central Nodes

(56) References Cited

FOREIGN PATENT DOCUMENTS

CN 108920527 A * 11/2018
CN 110275959 A * 9/2019 ........... G06F 16/288

OTHER PUBLICATIONS

Niepert et al. (Learning Convolutional Neural Networks for Graphs, published 2016) (Year: 2016).*

* cited by examiner

ACCURATE AND PERSONALIZED RECOMMENDATION METHOD BASED ON KNOWLEDGE GRAPH

CROSS-REFERENCE TO RELATED APPLICATION(S)

This application claims priority to and the benefit of Chinese Patent Application Serial No. 201911183454.6, filed Nov. 27, 2019, the entire disclosure of which is hereby incorporated by reference.

TECHNICAL FIELD

This disclosure relates to a field of machine learning, in particular to an accurate and personalized recommendation method based on a knowledge graph.

BACKGROUND

With development of information technology and Internet, people have gradually entered an era of information overload from an era of information scarcity. Nowadays, both information consumers and information producers are facing great challenges: as the information consumers, it is very difficult to find interesting information from a large amount of information. As the information producers, it is also very difficult to make their produced information stand out and get attention of a user. A recommendation system is an important tool to solve this contradiction. The recommendation system, which is an information filtering system, recommends the most likely interesting information to the user with his/her historical behaviors and preferences.

As a problem of information overload is becoming serious, more and more researchers begin to study the recommendation system. Previously, many researches have been focusing on an optimized collaborative filtering. The collaborative filtering predicts a possible behavior of the user in the future with an interaction between the user and objects. Although the collaborative filtering is simple and efficient in many cases, its recommendation effect is not so good with a sparse interaction between the user and objects. In order to solve this problem, the researchers use an auxiliary information to describe characteristics of the user and objects more accurately to compensate for data sparsity. More and more researchers select a knowledge graph as the auxiliary information. Compared with other auxiliary information, the knowledge graph has advantages as follows. The knowledge graph includes rich semantic information containing potential interests of the user, which facilitates an accuracy of recommendation results. Different relational links in the knowledge graph make the data denser, the recommended results easy to diverge, and facilitate diversity of the recommended results. The recommendation results of the knowledge graph have a link to a previous historical behavior of the user, meanwhile, a certain interest of the user can be inferred with the knowledge graph from the historical behaviors of the user, which brings a certain interpretability to the recommended results.

Since 2019, a recommendation system based on the knowledge graph based on a graph neural network (GNN) has gradually appeared. A GNN-based method enables a model to learn representation of nodes through an end-to-end training, and makes full use of a semantic and structural information in the knowledge graph, thus solving drawbacks of manual characteristic extraction in previous methods. Currently, the GNN-based method mainly extends an architecture of a graph convolution network (GCN) to the recommendation system based on the knowledge graph. Although these models have been proved to be effective with some public datasets, an interaction of the nodes in the models is insufficient, making the representation of the nodes in the knowledge graph inaccurate.

SUMMARY

In view of an inaccurate representation of a node in a recommendation model based on a knowledge graph, this disclosure provides a knowledge graph neural network model based on multi-dimensional interactions, in which user characteristics are added in a message transfer process and an interaction between a neighbor node and a central node is increased in an aggregation process, so as to adjust an update direction of the representation of the node. In the method, information of the knowledge graph can be fully used, the characteristics of the nodes are accurately represented, an accuracy of recommendation results can be improved.

An accurate and personalized recommendation method based on a knowledge graph includes following steps S1 to S5:

Step S1: acquiring relevant knowledge of objects from a knowledge base according to historical behaviors of a user to construct a knowledge graph;

Step S2: initializing a vector representation of each node and its connection and determining a receptive field of the node, for the constructed knowledge graph;

Step S3: generating training samples according to the historical behaviors of the user and initializing vector representations of all users and objects;

Step S4: acquiring a receptive field of an entity in the knowledge graph corresponding to an object in the training sample for each training sample, inputting the receptive field and the training sample to a graph neural network model, so as to obtain a predicted value of a possibility of an interaction between the user and the object; and optimizing model parameters by minimizing a loss function; and Step S5: ranking the predicted value of the possibility of the interaction between the user and all of the objects after the model optimization process is finished, so as to obtain a recommendation list of the user.

Further, in the recommendation method, in the constructed knowledge graph in step S1, the objects and their attributes are taken as entity nodes.

Further, in the recommendation method, a knowledge related to the objects forms the knowledge graph in a form of a triplet <h,r,t>.

Further, in the recommendation method, the initializing the vector representation of each node and its connection in step S2 is Xavier initialization.

Further, in the recommendation method, the determining the receptive field of each node in step S2 specifically includes steps S21 to S23:

Step S21: determining one-hop neighbors for all the nodes according to the knowledge graph;

Step S22: randomly selecting k one-hop neighbors for each node according to a predetermined neighbor size k, and if the number of the one-hop neighbors is less than k, randomly repeating the selected one-hop neighbors until the number of the one-hop neighbors hits k; and Step S23: forming the receptive field of each node according to a predetermined receptive field depth h, in which for each node n, a one-hop neighbor of a one-hop neighbor becomes a two-hop neighbor of the node, a one-hop neighbor of the two-hop neighbor becomes a three-hop neighbor of the node, and so on to a h-hop neighbor, all neighbors are involved in the receptive field of the node.

Further, in the recommendation method, the generating the training samples in step S3 includes: for each of historical behaviors of the user, a corresponding user-object link <u,v,1> is taken as a positive samples, while a corresponding number of negative samples <u,v',0> are generated.

Further, in the recommendation method, the initializing the vector representation of each user and objects in step S3 is Xavier initialization.

Further, in the recommendation method, an operation of the graph neural network model in step S4 includes following steps S41 to S45:

Step S41: propagating, for each of the nodes, its characteristics to the neighbor nodes through the connection, a connection type r and a user characteristic u being concerned in the propagating process;

Step S42: multiplying the neighborhood characteristic element-wise by the characteristic of the node, weighting and summing, and inputting the multiplying result, the neighborhood characteristic and the node characteristic into an aggregation function, so as to obtain a new characteristic of each node, a set of the characteristics propagated by all of its one-hop neighbors being a neighborhood characteristic for each of the nodes;

Step S43: repeating step S41 and step S42 by h−1 times to obtain the new characteristic of the entity corresponding to the object as the vector representation of the object;

Step S44: calculating the possibility of the interaction between the object and the user with a prediction function, the prediction function being an inner product of the vector representation of the object and the vector representation of the user; and Step S45: calculating the loss function, minimizing the loss function with an Adam optimization algorithm, and updating parameters of the model.

The method has following beneficial effects: a sparsity of a historical behavior information of a user is compensated with knowledge graph information, and the user and objects are depicted from multi-dimension, so that a personalized recommendation result is more accurate; through increasing an interaction between nodes in processes of a message transfer and aggregation, a update direction of a representation of a node is changed, so that the update direction of the nodes meets following four common senses: users who buy the same objects are closer, objects purchased by the same user are closer, objects with the same attributes are closer and users with the same interest are closer. This makes the model certainly interpretable, and the representation of the node more accurate. This disclosure provides a end-to-end trained model architecture, in which a need to manually extract characteristics is eliminated, so not to introduce human bias into the model, while a manual design is reduced.

DETAILED DESCRIPTION

Figure 1:
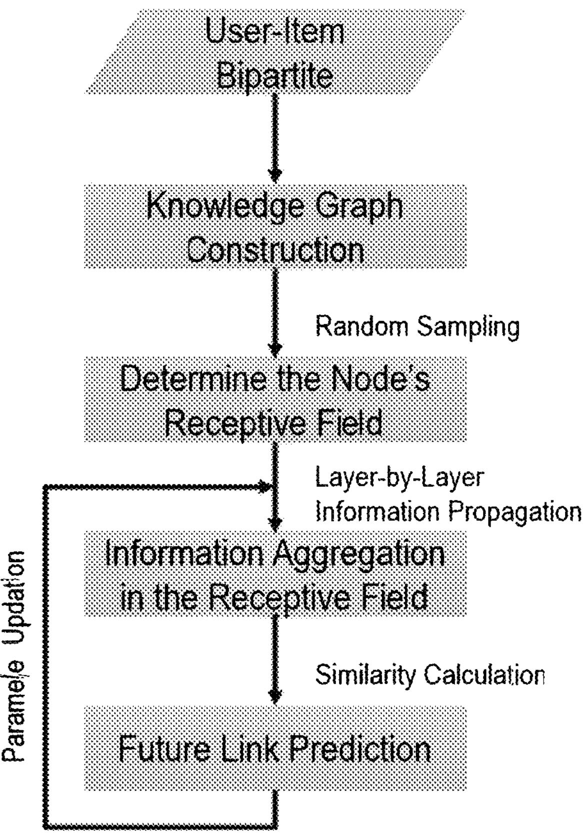
FIG. 1 is a flow chart of an accurate and personalized recommendation method based on a knowledge graph according to the present disclosure.
Figure 2:
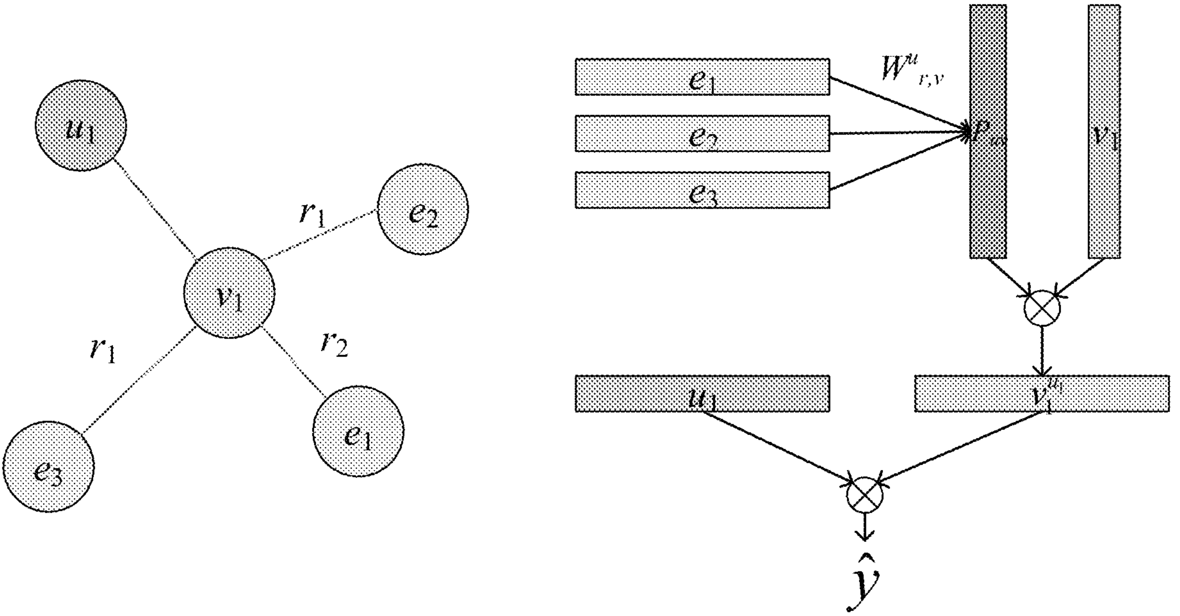
FIG. 2 shows a calculation of a graph neural network.
Figure 3:
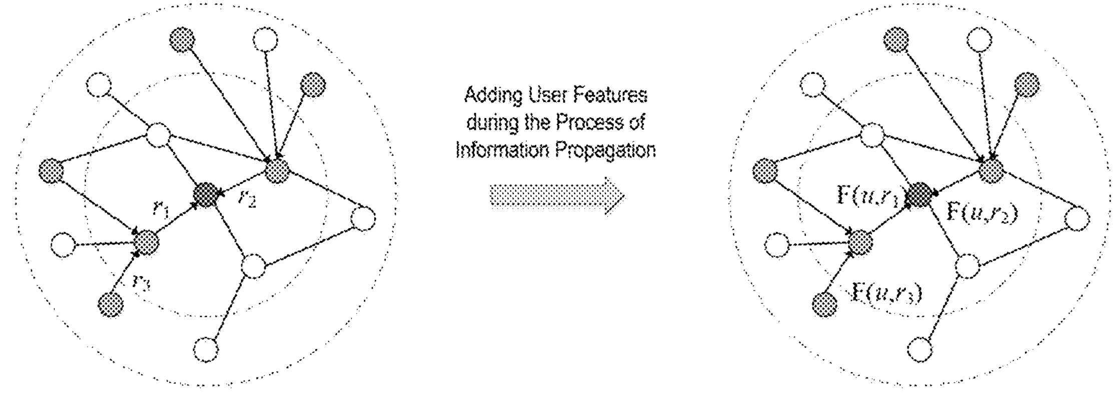
FIG. 3 shows a calculation of an edge weight in a message transfer process.
Figure 4:
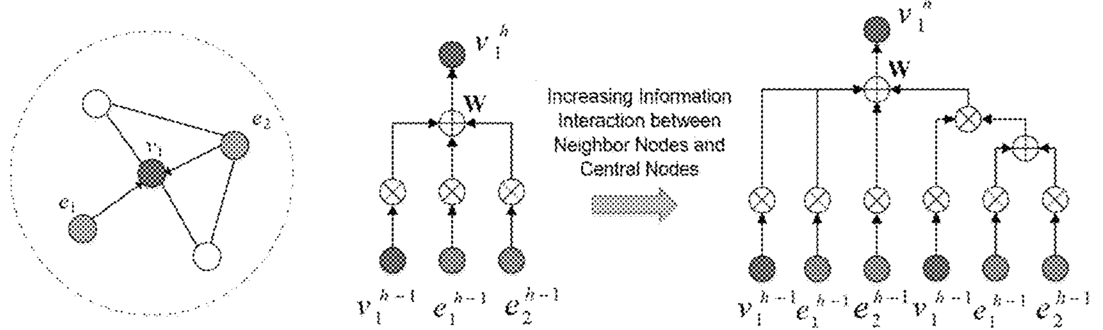
FIG. 4 shows a generation of a new state of a central node in an aggregation process.

Technical schemes of the present disclosure will be further described in the following with reference to the drawings.

An accurate and personalized recommendation method based on a knowledge graph includes following steps S1 to S5.

In Step S1: relevant knowledge of objects from a knowledge base is acquired according to historical behaviors of a user to construct a knowledge graph.

In Step S2, a vector representation of each node and its connection is initialized and a receptive field of the node, for the constructed knowledge graph is determined.

In Step S3: training samples are generated according to the historical behaviors of the user and vector representations of all users and objects are initialized.

In Step S4: a receptive field of an entity in the knowledge graph corresponding to an object in the training sample is acquired for each training sample, the receptive field and the training sample are inputted to a graph neural network model, so as to obtain a predicted value of a possibility of an interaction between the user and the object; and model parameters are optimized by minimizing a loss function.

In Step S5: the predicted value of the possibility of the interaction between the user and all of the objects is ranked after the model optimization process is finished, so as to obtain a recommendation list of the user.

Description of the technical schemes of the present disclosure is detailed in the following.

In Step S1: relevant knowledge of objects from a knowledge base is acquired according to historical behaviors of a user to construct a knowledge graph.

In the constructed knowledge graph, the objects and their attributes are taken as entity nodes; knowledge related to the objects forms the knowledge graph in a form of a triplet <h,r,t>. For example, there is a known knowledge that "Chen Kaige directed Me and my country", which can be converted into a triplet <Me and my country, Directed, Chen Kaige>.

In Step S2, a vector representation of each node and its connection is initialized and a receptive field of the node, for the constructed knowledge graph is determined.

Initializing the vector representation of each node and its connection in step S2 is Xavier initialization.

The determining the receptive field of each node specifically includes steps S21 to S23.

In Step S21, one-hop neighbors for all the nodes according to the knowledge graph are determined.

In Step S22, k one-hop neighbors are randomly selected for each node according to a predetermined neighbor size k, and if the number of the one-hop neighbors is less than k, the selected one-hop neighbors are randomly repeated until the number of the one-hop neighbors hits k.

In Step S23, the receptive field of each node is formed according to a predetermined receptive field depth h, in which for each node n, a one-hop neighbor of a one-hop neighbor becomes a two-hop neighbor of the node, a one-hop neighbor of the two-hop neighbor becomes a three-hop neighbor of the node, and so on to a h-hop neighbor, all neighbors are involved in the receptive field of the node.

In Step S3: training samples are generated according to the historical behaviors of the user and vector representations of all users and objects are initialized.

The generating the training samples includes: for each of historical behaviors of the user, a corresponding user-object link <u,v,1> is taken as a positive samples, while a corresponding number of negative samples <u,v',0> are generated. The initializing the vector representation of each user and objects is Xavier initialization.

In Step S4: a receptive field of an entity in the knowledge graph corresponding to an object in the training sample is acquired for each training sample, the receptive field and the training sample are inputted to a graph neural network model, so as to obtain a predicted value of a possibility of a interaction between the user and the object; and model parameters are optimized by minimizing a loss function.

An operation of the graph neural network model includes following steps S41 to S45.

In Step S41, for each of the nodes, its characteristics are propagated to the neighbor nodes through the connection, a connection type r and a user characteristic u are concerned in the propagating process;

$$W_{r,v}^{u} = F(u, r) = \frac{\exp(u \cdot r_{v,v_N})}{\sum_{v_N \in N_v(i)} \exp(u \cdot r_{v,v_N})};$$

where, u indicates the user, v indicates a node which the object corresponds in the knowledge graph, vN indicates a neighbor node of the node, r indicates a vector of the connection between v and vN, and Nv(i) indicates a set of the receptive field of the node v.

In Step S42, the neighborhood characteristic is multiplied element-wise by the characteristic of the node, weighting and summing, and the multiplying result, the neighborhood characteristic and the node characteristic are inputted into an aggregation function, so as to obtain a new characteristic of each node, a set of the characteristics propagated by all of its one-hop neighbors is a neighborhood characteristic for each of the nodes;

The neighborhood characteristics are represented as:

$$p_{uv} = \sum_{v_N \in N_v(i)} W_{r,v}^{u} \cdot v_N;$$

The aggregation function is represented as:

$$agt = \sigma(W_1(v+p_{uv}) + W_2 Q(v, p_{uv}) + b).$$

In Step S43, step S41 and step S42 are repeated by h−1 times to obtain the new characteristic of the entity corresponding to the object as the vector representation of the object.

$$v^u = v^h = \sigma\left(W_1\left(v^{h-1} + \sum_{v_N \in N_v(i)} W_{r,v}^{u} \cdot v_N^{h-1}\right) + W_2 Q\left(v^{h-1}, \sum_{v_N \in N_v(i)} W_{r,v}^{u} \cdot v_N^{h-1}\right) + b\right).$$

In Step S44, the possibility of the interaction between the object and the user is calculated with a prediction function, the prediction function is a inner product of the vector representation of the object and the vector representation of the user. The inner product is represented as:

$$\hat{y}_{uv} = u \cdot v^u.$$

In Step S45, the loss function is calculated, the loss function is minimized with an Adam optimization algorithm, and parameters of the model are updated. The loss function is represented as:

$$L = \sum_{u \in U} \left( \sum_{v: a_{uv}=1} L_c(a_{uv}, \hat{y}_{uv}) - \sum_{i=1}^{T^u} E_{v_i \sim P(v_i)} L_c(a_{uv_i}, \hat{y}_{uv_i}) \right) + \lambda \|W_1 + W_2\|_2^2.$$

In Step S5: the predicted value of the possibility of the interaction between the user and all of the objects is ranked after the model optimization process is finished, so as to obtain a recommendation list of the user.

What is claimed is:

1. A computer-implemented accurate and personalized recommendation method based on a knowledge graph, comprising:

Step S1: acquiring relevant knowledge of objects from a knowledge base according to historical behaviors of a user to construct a knowledge graph;

Step S2: initializing a vector representation of each node and its connection and determining a receptive field of the node, for the constructed knowledge graph;

Step S3: generating training samples according to the historical behaviors of the user and initializing vector representations of all users and objects;

Step S4: acquiring a receptive field of an entity in the knowledge graph corresponding to an object in the training sample for each training sample, inputting the receptive field and the training sample to a graph neural network model, so as to obtain a predicted value of a possibility of an interaction between the user and the object; and optimizing model parameters by minimizing a loss function; and Step S5: ranking the predicted value of the possibility of the interaction between the user and all of the objects after the model optimization process is finished, so as to obtain a recommendation list of the user, wherein, the determining the receptive field of each node in step S2 specifically comprises:

Step S21: determining one-hop neighbors for all the nodes according to the knowledge graph;

Step S22: randomly selecting k one-hop neighbors for each node according to a predetermined neighbor size k, and if the number of the one-hop neighbors is less than k, randomly repeating the selected one-hop neighbors until the number of the one-hop neighbors hits k; and Step S23: forming the receptive field of each node according to a predetermined receptive field depth h, in which for each node n, a one-hop neighbor of a one-hop neighbor becomes a two-hop neighbor of the node, a one-hop neighbor of the two-hop neighbor becomes a three-hop neighbor of the node, and so on to a h-hop neighbor, all neighbors are involved in the receptive field of the node, and wherein, an operation of the graph neural network model in step S4 comprises:

Step S41: propagating, for each of the nodes, its characteristics to the neighbor nodes through the connection, a connection type r and a user characteristic u being concerned in the propagating process, wherein, user characteristics are added in a message transfer process;

Step S42: multiplying the neighborhood characteristic element-wise by the characteristic of the node, weighting and summing, and inputting the multiplying result, the neighborhood characteristic and the node characteristic into an aggregation function, an interaction between a neighbor node and the node is increased in an aggregation process, so as to adjust an update direction of the representation of the node and obtain a new characteristic of each node, a set of the characteristics propagated by all of its one-hop neighbors being a neighborhood characteristic for each of the nodes;

Step S43: repeating step S41 and step S42 by h−1 times to obtain the new characteristic of the entity corresponding to the object as the vector representation of the object;

Step S44: calculating the possibility of the interaction between the object and the user with a prediction function, the prediction function being an inner product of the vector representation of the object and the vector representation of the user; and Step S45: calculating the loss function, minimizing the loss function with an Adam optimization algorithm, and updating parameters of the model.

2. The recommendation method according to claim 1, wherein in the constructed knowledge graph in step S1, the objects and their attributes are taken as entity nodes.

3. The recommendation method according to claim 1, wherein a knowledge related to the objects forms the knowledge graph in a form of a triplet <h,r,t>.

4. The recommendation method according to claim 1, wherein the initializing the vector representation of each node and its connection in step S2 is Xavier initialization.

5. The recommendation method according to claim 1, wherein the generating the training samples in step S3 comprises: for each of historical behaviors of the user, a corresponding user-object link <u,v,1> is taken as a positive samples, while a corresponding number of negative samples <u,v',0> are generated.

6. The recommendation method according to claim 1, wherein the initializing the vector representation of each user and objects in step S3 is Xavier initialization.

* * * * *